Figure 1:
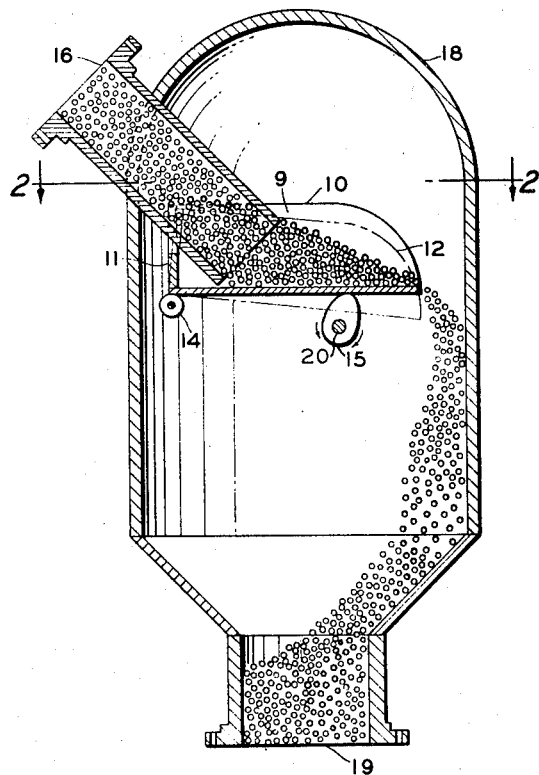

March 6, 1951  L. J. WEBER  2,544,576
PEBBLE FEEDER

Filed June 21, 1948  2 Sheets-Sheet 1

INVENTOR.
L. J. WEBER

BY
Hudson and Young
ATTORNEYS

March 6, 1951  L. J. WEBER  2,544,576
PEBBLE FEEDER

Filed June 21, 1948  2 Sheets-Sheet 2

INVENTOR.
L. J. WEBER

BY Hudson and Young

ATTORNEYS

Patented Mar. 6, 1951

2,544,576

UNITED STATES PATENT OFFICE 2,544,576

PEBBLE FEEDER

Louis J. Weber, Bartlesville, Okla., assignor to Phillips Petroleum Company, a corporation of Delaware Application June 21, 1948, Serial No. 34,317

6 Claims. (Cl. 263—19)

This invention relates to the flow of a contiguous mass of solid particulate material. In one aspect this invention relates to apparatus for contacting fluids with a moving contiguous mass of solid particulate material. In other aspect this invention relates to the regulation of flow of pebbles in a pebble heater apparatus. In a more specific aspect this invention relates to pebble feeders.

Apparatus especially applicable in hydrocarbon conversion and heat exchange processes, and which utilizes a moving contiguous mass of solid refractory contact material as a heat exchange medium, is commonly referred to as a pebble heater. Pebble heaters are most typically applied in the high temperature hydrocarbon conversion field by contacting a moving contiguous mass of solid refractory contact material with hot gases in a first heat exchange step, and then utilizing the moving bed of heated refractory material as a heat transfer medium in a second heat transfer step to supply heat to fluids in direct contact therewith.

The term "pebble" as used herein refers to the small pebble-like, solid, refractory material comprising an element of the contact mass generally used in pebble heater apparatus. Pebbles so used, are preferably substantially spherical and relatively uniform in size, although in some instances they may be rod-shaped or irregular in size. Spheres of 1/8" to 1" in diameter function desirably, and those about 1/4" to 1/2" are most practicable. Pebbles, as used herein, comprise any solid refractory material of flowable form, size and strength suitable for carrying heat for transfer to gases in contact therewith. Pebbles comprising beryllia, alumina, zirconia, mullite, and periclase, for example, make excellent contact material for most processes. Metal balls such as nickel, "Monel," and "Inconel," iron, etc. have utility in specific processes. Pebbles and/or pebble surfaces may be catalytically active, or inert, to gases in contact therewith, depending on the specific process.

Conventional pebble heater apparatus usually comprises a series of at least two chambers positioned vertically with respect to each other. The top and bottom chambers are referred to respectively as the pebble heating chamber and the gas contacting chamber or, preferably herein, the reaction chamber. A combustion chamber is positioned subjacent or in close proximity to the sides of the lower portion of the pebble heating chamber. Occasionally all of these zones are formed within one elongated chamber. Hot gases from the combustion chamber are injected into the pebble heating chamber and passed therein countercurrently in contact with the down flowing contiguous mass of pebbles. Hot gases so utilized, usually comprise combustion or flue gases produced in the combustion chamber, from substantially complete burning of a combustible gas. However, if desired, hot gases can be supplied to the pebble heater chamber from a source external to the pebble heater apparatus. Hot gas in contact with the pebble mass transfers heat thereto in a first heat transfer step. Effluent gas from the pebble heating chamber, having transferred heat to the pebbles, is relatively cool and is passed through the upper portion of the chamber for utilization elsewhere, or to the stack. Pebbles thus heated in a first heat transfer step are passed downwardly from the pebble heating chamber through a conduit commonly called the pebble throat, to the reaction chamber and are therein contacted in countercurrent flow with upwardly flowing feed gases in a second heat transfer step. Effluent gas from the reaction chamber is passed from its top portion. Pebbles, relatively cool subsequent to the transfer of heat to the feed gas, are passed into the lower portion of the reaction chamber and discharged to a means, such as for example, an elevator, for recycling such discharged pebbles to the inlet of the pebble heating chamber.

Utilization of pebble heating apparatus is applicable and advantageous in various processes such as hydrocarbon conversion, gas absorption, and gas-solid heat exchange, in general. A principal use of pebble heater apparatus is in the conversion of hydrocarbons, involving thermal or catalytic processes such as cracking, hydrogenation, dehydrogenation, isomerization, polymerization, oxidation and the like. It is imperative, of course, in such a utilization of pebble heater apparatus, to effect controlled conditions of temperature and contact time between feed gases and the pebble heat transfer mass in the reaction chamber, in order to prevent overreacting or underreacting, with the accompanying excessive carbon formation or undesirable low conversion levels, as the particular case would be. It is equally imperative to effect controlled conditions of temperature and contact time in the pebble heating chamber between hot flue gases and pebbles to be heated, in order to prevent inefficient utilization of hot flue gases as a heat transfer medium, and to prevent uneven heating of the contact mass to be utilized in the second heat transfer step, in the subjacently positioned gas reaction chamber.

To effect such control of contact time between the pebble mass and gases, in both the pebble heating chamber and the gas reaction chamber, it is necessary to regulate the movement of pebbles throughout the chambers aforesaid to conform to a specific and usually constant rate depending upon the particular utilization of the pebble heater apparatus.

An object of this invention is to provide a means for regulating and maintaining a flow of contiguous solid particulate material through an apparatus.

Another object is to provide means for maintaining a desired rate of flow of pebbles through a pebble heater apparatus.

Another object is to provide a means for regulating the flow of pebbles through a pebble heater apparatus to conform to a specific flow rate.

Another object is to provide a pebble feeder apparatus to be employed in conjunction with a pebble heater apparatus to regulate the rate at which pebbles flow therethrough and to maintain a desired rate of such pebble flow.

Another object is to provide an apparatus for controlling the rate of heat transfer between pebbles and fluids in a pebble heater.

It is still another object of this invention to provide a pebble heater apparatus in which the rate of pebble circulation may be varied so as to maintain constant heat input, or reaction rate, in the conversion chamber.

The pebble feeder of my invention is operated in conjunction with a pebble heater apparatus and comprises a pebble receptacle, or hopper, having one end pivotally supported, and the other end movably supported, the latter named end being adapted thereby to be raised and lowered, or oscillated through an arc having a radius originating with the point of pivotal support. The pivotally supported end is preferably, and usually, closed and the movably supported end is open. The hopper is enclosed in a casing which is pressure tight within the range of the operating pressure of the pebble heater apparatus, usually from 0.5 to 10 p. s. i. g. A conduit, receiving pebbles from a pebble heater chamber extends through the casing into the hopper through its open top, and terminates so as to provide for a flow of pebbles to the hopper. In many instances, the pebble conduit extends into the hopper to comprise at least a partial closure of the pivotally supported end. When the hopper is oscillated, pebbles may constantly overflow the open end, the rate of flow being highest when the open end is in the lowermost position, and lowest when the open end is in the uppermost position. When the hopper is at rest, with the open end in its uppermost position, pebbles will not overflow. The amplitude of the oscillation and the rate of oscillation determine the rate at which pebbles overflow the hopper, or in other words, the rate at which pebbles are delivered from the pebble feeder. A pebble outlet means is positioned in the lower portion of the casing through which pebbles, overflowing the hopper, are discharged to a means external to the feeder, usually an elevator for recycling pebbles to the pebble heating chamber of the pebble heater apparatus.

The conduit extending into the hopper is preferably inclined at a minimum angle with the horizontal, of 15°. Such an angle can be within the range of 15 to 90°, although the preferred range is usually 30 to 70°. The conduit so extends, such that its projected axis preferably intersects the plane of the bottom of the hopper in the half portion adjacent the pivotally supported end. The amplitude of the oscillation is within an arc of 90°. A preferable range however of such an arc is within the limits of 15 to 60°.

Various modifications of my feeder apparatus may be made and still remain within the scope of my invention. For example, in one such modification, the hopper may be rigidly attached near the middle at its exterior bottom side to a rotatably movable support member, horizontally disposed at right angles to the longitudinal axis of the hopper. In such a modification, both ends of the hopper are open, and the bottom of the hopper is spaced in relation to the end of the conduit, such that pebble flow from the conduit may be either prevented or substantially reduced, if desired, when the hopper is horizontally disposed. When each end portion of the hopper is oscillated with respect to the aforesaid rotatable support member, pebbles will flow from the end of the lowermost portion. The ends may be partially closed if desired, to further control pebble flow rate. The amplitude of oscillation and rate of oscillation may be chosen to effect a desired rate of total pebble flow from the conduit, and hence a desired rate of pebble flow in the pebble heater.

In the following discussion, one form of the apparatus of this invention will be specifically described. It is to be understood that the figures are diagrammatic and may be altered in many respects by those skilled in the art and yet remain within the intended scope of my invention.

Figure 2:
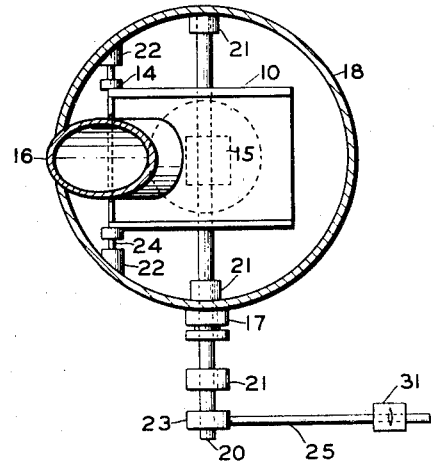
Figure 3:
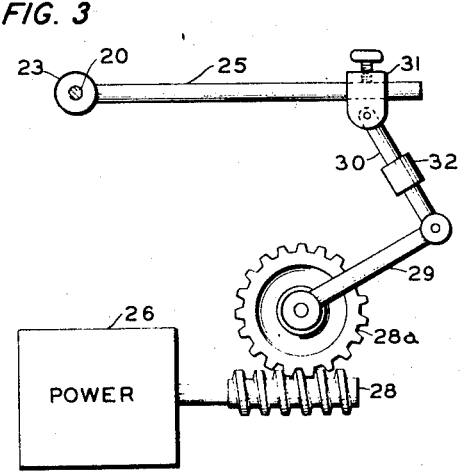
Figure 4:
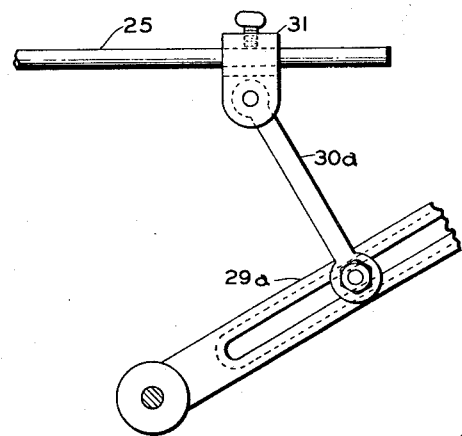
Figure 6:
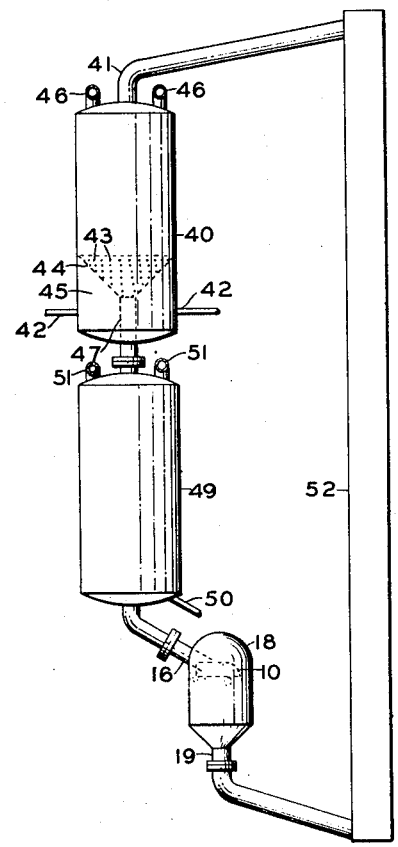
Figure 5:
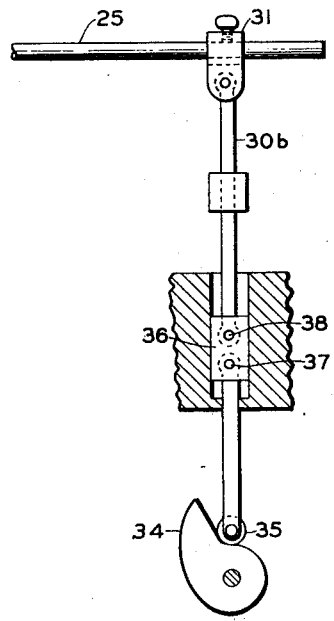

Figure 1 is a sectional elevation of the pebble feeder and shows the hopper, support means therefor, the pebble conduit, and the casing. Figure 2 is a sectional plan view taken on line 2—2 of Figure 1. Figure 3 is an end elevation of a preferred crank and pitman means for driving the lever means of Figure 2. Figure 4 shows a crank and pitman means alternative to the preferred arrangement illustrated in Figure 3. Figure 5 shows still another crank and pitman means alternative to that illustrated in Figure 3. Figure 6 is a diagrammatic illustration of one embodiment in which a pebble heater apparatus may be operated in conjunction with the pebble feeder of my invention.

Referring now to Figure 1, hopper 10 having an open top 9 is closed at end 11, open at end 12, supported subjacent closed end 11 by pivot support 14, and supported at a point toward open end 12 by cam 15. Casing 18 encloses hopper 10. Pebble conduit 16, receives pebbles from a pebble chamber such as chamber 49 of Fig. 6, and extends through casing 18 into open top 9, a spaced distance from the bottom hopper 10 so as to provide for a flow of pebbles from the pebble chamber to the hopper. Movable support means 15 and pivotal support means 14 are positioned within casing 18. Pebble outlet means 19 is located in the bottom portion of casing 18 for discharge of pebbles flowing from hopper 10. Referring to Figure 2, cam 15 is affixed to rotatable shaft 20, preferably at a point equidistant from the sides of the hopper. Shaft 20 is extended into casing 18 through packing gland 17 mounted integrally therewith and is supported by bearings 21. Pivotal support 14 is supported within casing 18 by shaft 24 which is supported by bearings 22.

Referring to Figure 3, worm 28, rotated by a power source 26 such as an electric motor or a steam turbine, rotates crank 29 by rotating worm gear 28a, and produces a reciprocating motion of pitman 30, thereby causing lever 25 to oscillate through an arc originating at 23. Lever 25, when so oscillating reversibly rotates shaft 20 and cam 15 and produces thereby an oscillation of hopper 10 through an arc having a radius originating at the point of pivotal support 14. The amplitude of the oscillation of the hopper 10 is determined by the effective length of lever arm 25 which may be regulated by the position of block 31, which in turn may be retained in any desired position along the length of lever 25. The limits of oscillation are fixed by the length of pitman 30 which may be varied by turnbuckle 32, thereby providing for oscillating hopper 10 through any desired arc, preferably.

Figure 4 shows an alternate crank 29a and pitman means 30a for driving lever 25, in which the limits of oscillation are regulated by positioning one end of pitman 30a in crank 29a. Figure 5 shows an additional alternate means for driving lever 25, in which rotating cam 34 produces a reciprocating motion of the rod carrying the cam follower 35. This reciprocating motion is in turn carried to crosshead 36 and pitman 30b. Using the alternate means of Figure 5, the oscillation of hopper 10 is accompanied by a jarring action, the degree of which may be regulated by the contour of cam 34. Such driving means is often preferable in those instances wherein a high rate of oscillation of minimum amplitude is desired.

Figure 6 is a schematic showing of a conventional pebble heater apparatus operating in conjunction wtih the pebble feeder of this invention. Referring to Figure 6, pebbles are passed into the upper portion of pebble heating chamber 40, through pebble inlet 41. The pebbles pass downwardly through chamber 40 and build up a contiguous pebble mass therein. Gaseous combustible materials, together with air or another oxygen-containing gas, are charged through inlet conduits 42, either separately or in admixture, to combustion chamber 45, subjacent chamber 40, and substantially completely burned therein. The combustion gases pass upwardly through openings 43 in perforate member 44, which separates pebble heating chamber 40 and combustion chamber 45. The hot combustion gases rise through the downwardly moving contiguous mass of pebbles in direct heat exchange therewith, heating the pebbles to a high temperature. The pebbles are normally heated to a temperature level in the range of 1400 to 3500° F., but lower or higher temperatures may be used as required by specific processes. As the combustion gas exits from the top of the pebble bed, it is passed from chamber 40 through outlet conduits 46. The heated contiguous pebble mass moves from the pebble heating chamber downwardly through throat conduit means 47 into reaction chamber 49, wherein it is brought into direct heat exchange relation with a fluid to be heated and/or reacted. For example, the heated pebbles may be used to supply heat to crack a light paraffinic mixture comprising ethane and propane so as to produce olefins, in which instance, the temperature in the reaction chamber would be in the order of 1700–2000° F. Fluid charge materials are fed through inlet conduit 50 to the pebble bed in chamber 49 and rise through the reaction chamber, in heat exchange relation with the downwardly flowing pebbles, and pass from chamber 49 through effluent outlets 51. Pebbles, relatively cool subsequent to the transfer of heat to the fluid charged to chamber 49, are passed from the bottom of chamber 49 through conduit 16 to hopper 10 in casing 18 of the pebble feeder of this invention, described in detail hereinabove, and illustrated in elevation by Figure 1 of the attached drawings. The hopper and related parts of the pebble feeder in direct contact with pebbles, are maintained usually at a temperature within the limits of 400–1200° F. depending upon the specific application of the pebble heater apparatus. Pebbles overflowing hopper 10 are discharged from casing 18 through conduit means 19 to elevator 52 for recycle to pebble heating chamber 40, through conduit 41.

The rate of pebble flow from conduit 16 to feeder hopper 10, and hence the pebble flow rate through the entire pebble heater, is dependent upon the rate and amplitude of oscillation of hopper 10, as already discussed above in detail.

The pebble feeder of this invention provides means for regulating the rate of heat input into the reaction zone, and, therefore provides a means for maintaining a constant temperature level in the reaction zone. The reaction rate, the conversion per pass, etc., may be maintained at predetermined levels or varied by adjusting the amplitude and rate of oscillation of the feeder hopper 10.

As will be evident to those skilled in the art various modifications can be made or followed, in the light of the foregoing discussion and disclosure, without departing from the spirit or scope of the disclosure or from the scope of claims.

I claim:

1. A pebble feeder device for regulating the flow of pebbles in a pebble heater, comprising a pebble receptacle having an open top, a closed end, and an open end; means for pivotally supporting said receptacle at its closed end, means for movably supporting said receptacle at its open end said receptacle thereby being adapted to be oscillated through an arc originating with the point of pivotal support therefor; a pressure-tight casing enclosing said receptacle; a conduit for admitting pebbles to said receptacle, said conduit extending through said casing into the open top of said receptacle a spaced distance from the bottom thereof to permit pebbles to flow to said receptacle, said conduit so extending that the projected axis of same intersects the bottom of said receptacle at a point within the half portion adjacent said closed end and being so inclined as to deliver pebbles in a direction toward said open end, said receptacle when oscillating causing pebbles to continuously overflow said open end; means for varying the rate and amplitude of said oscillation; and outlet means in said casing for discharging pebbles overflowing said open end.

2. A pebble feeder device for regulating the flow of pebbles in a pebble heater, comprising a pebble receptacle having an open top and at least one open end and one closed end; a pressure-tight casing enclosing said receptacle; an unobstructed conduit for admitting pebbles to said receptacle, said conduit extending through said casing into the open top of said receptacle and being inclined in a direction toward said open end of said receptacle and with the projected axis of said conduit intersecting the bottom of said receptacle at a point within the half portion adjacent said closed end so as to permit pebbles to flow thereinto; means for supporting said receptacle; means for oscillating said receptacle so as to move said open end through a predetermined arc, said receptacle when oscillating causing pebbles to overflow said open end at a rate dependent upon the amplitude and rate of said oscillation; means for varying the rate and amplitude of said oscillation; and outlet means in said casing for discharging pebbles overflowing said open end.

3. A pebble feeder device for regulating the continuous flow of pebbles in a pebble heater, comprising a pebble receptacle having an open top, a closed end, and an open end; means for pivotally supporting said receptacle at its closed end, means for movably supporting said receptacle at its open end, said receptacle thereby being adapted to be oscillated through an arc originating with the point of pivotal support therefor, said arc having a value within the limits of 15 to 60°; a casing enclosing said receptacle, said casing being pressure tight at a pressure within the limits of 0.5 and 10 p. s. i. g.; a conduit for admitting pebbles to said receptacle, said conduit extending through said casing into said open top so that the projected axis of said conduit intersects the bottom of said receptacle at a point within the half portion adjacent said closed end, said conduit extending into said open top at an angle with the horizontal within the limits of 30 to 70° and being inclined so as to deliver pebbles in a direction toward said open end; said receptacle when oscillating causing pebbles to continuously overflow said open end at a maximum rate when said open end is in a lowermost position, at a minimum rate when said open end is in an uppermost position and at a proportionately altered rate when said open end is in a position intermediate said uppermost and lowermost position, means for varying the rate and amplitude of said oscillation; and outlet means in said casing for discharging pebbles continuously overflowing said open end.

4. A pebble feeder device for continuously regulating the flow of pebbles in a pebble heater, comprising a pebble receptacle having an open top and one open end; a casing enclosing said receptacle, said casing being pressure tight at a pressure within the limits of 0.5 and 10 p. s. i. g.; a conduit for admitting pebbles to said receptacle, said conduit extending through said casing into the open top of said receptacle so that the the projected axis of said conduit intersects the bottom of said receptacle at a point within the half portion adjacent the closed end, said conduit extending into said open top at an angle with the horizontal within the limits of 15° to 90° and being inclined so as to deliver pebbles in a direction toward said open end; pivotal support means for said receptacle at its closed end, said pivotal support means comprising a first shaft horizontally disposed and pivotally attached to said receptacle subjacent the closed end thereof and extending interiorally across said casing, bearing support means for said first shaft; movable support means for said receptacle at its open end, said movable support means comprising a cam subjacent the bottom of said receptacle and a second shaft reversibly rotatable and parallel to said first shaft and extending through at least one side of said casing and interiorally across same subjacent the bottom of said receptacle intermediate its ends, said cam being rigidly attached to said second shaft; bearing support means for said second shaft, drive means for reversibly rotating said second shaft at a variable rate through a predetermined arc whereby said cam causes said receptacle to oscillate at a variable rate and amplitude through an arc having a radius originating with the point of said pivotal support; said receptacle when oscillating causing pebbles to continuously overflow said open end at a rate dependent upon the rate and amplitude of said oscillation, and receptacle oscillating at a variable rate and amplitude; and outlet means in said casing for discharging pebbles overflowing said open end.

5. The apparatus of claim 1 wherein said receptacle is adapted to be oscillated through an amplitude originating above the horizontal.

6. A feeder device for continuously controlling the rate of downward flow of a moving contiguous mass of pebbles through a pebble heater apparatus, comprising a pebble receptacle having an open top, a closed end and an open end; a housing enclosing said receptacle and being pressure-tight at the operating pressure of said pebble heater apparatus; an unobstructed conduit for admitting pebbles from said pebble heater to said receptacle, in communication with pebbles in the lower portion of said pebble heater apparatus and extending through said housing into the open top of said receptacle in a direction toward said open end at an incident angle within the limits of 30 to 70°, and so that the projected axis of said conduit intersects the bottom of said receptacle at a point within the half portion adjacent the closed end, whereby a stream of a contiguous mass of pebbles from said pebble heater apparatus is admitted from said pebble heater to said receptacle; pivotal support means for said receptacle subjacent the closed end thereof; movable support means for said receptacle at its open end, said receptacle thereby being adapted to be oscillated through an arc originating with the point of pivotal support therefor; said receptacle when oscillating causing pebbles from said contiguous mass to continuously overflow said open end at a rate dependent upon the rate and amplitude of said oscillation, said receptacle being adapted to oscillate at a variable rate and amplitude thereby providing means for regulating a continuous flow of pebbles through said pebble heater; and outlet means in said housing for discharging pebbles continuously overflowing the open end of said receptacle.

LOUIS J. WEBER.

REFERENCES CITED

The following references are of record in the file of this patent:

UNITED STATES PATENTS

| Number | Name | Date |
| --- | --- | --- |
| 277,666 | Blake | May 15, 1883 |
| 1,014,383 | Frazee | Jan. 12, 1912 |
| 1,190,168 | Holly | July 4, 1916 |
| 2,417,049 | Bailey et al. | Mar. 11, 1947 |
| 2,489,925 | Omwake | Nov. 29, 1949 |

Certificate of Correction

Patent No. 2,544,576                                  March 6, 1951

LOUIS J. WEBER

It is hereby certified that error appears in the printed specification of the above numbered patent requiring correction as follows:

Column 1, line 5, for the word "other" read *another*; column 8, line 12, for "and receptacle" read *said receptacle*;

and that the said Letters Patent should be read as corrected above, so that the same may conform to the record of the case in the Patent Office.

Signed and sealed this 22nd day of May, A. D. 1951.

[SEAL]

THOMAS F. MURPHY,
*Assistant Commissioner of Patents.*